United States Patent [19]
Kaliaguine et al.

[11] Patent Number: 6,017,504
[45] Date of Patent: Jan. 25, 2000

[54] PROCESS FOR SYNTHESIZING PEROVSKITES USING HIGH ENERGY MILLING

[75] Inventors: Serge Kaliaguine, Lac Saint-Charles; André Van Neste, Sainte-Foy, both of Canada

[73] Assignee: Universitè Laval, Quebéc, Canada

[21] Appl. No.: 09/116,732

[22] Filed: Jul. 16, 1998

[51] Int. Cl.[7] ............................ C01F 17/00; C01G 51/00; C01G 53/00; C01G 49/00; C01G 45/00
[52] U.S. Cl. ......................... 423/263; 423/593; 423/594; 423/595; 423/596; 423/598; 423/599
[58] Field of Search ...................... 423/263, 593, 423/594, 595, 596, 598, 599; 502/525

[56] References Cited

U.S. PATENT DOCUMENTS

| | | | |
|---|---|---|---|
| 4,055,513 | 10/1977 | Wheelock | 252/462 |
| 4,065,544 | 12/1977 | Hamling et al. | 423/252 |
| 4,134,852 | 1/1979 | Volin . | |
| 4,151,123 | 4/1979 | Mccann, III | 252/462 |
| 4,738,946 | 4/1988 | Yamashita et al. | 502/303 |
| 5,093,301 | 3/1992 | Chu et al. . | |
| 5,380,692 | 1/1995 | Nakatsuji et al. | 502/303 |
| 5,900,223 | 5/1999 | Matijevic et al. | 423/593 |

OTHER PUBLICATIONS

"Structural Transformations of Alumina by High Energy Ball Milling" P.A. Zielinski et al., In J. Matter. Res., 1993, vol. 8, pp. 2985–2992.

"Oxydes Ceramiques Elabores Par Voie Mecanochimique", D. Michel et al., La Revue De Metallurgie–CIT/ Sciences et Geneies Des Materiaux, Feb. 1993.

"Stabilizedd Zirconias Prepared by Mechanical Alloying" D. Michel et al., J. Am. Ceram. Soc., 1993, vol. 76, pp. 2884–288.

Formation of Nanostructural Material Induced by Mechnanical Processings (Overview), E. Gaffet et al., Mat. Trans. JIM 1995, vol. 36 (1995) pp. 198–209.

*Primary Examiner*—Steven Bos
*Attorney, Agent, or Firm*—Darby & Darby

[57] ABSTRACT

Perovskite-type structure compounds having the general empirical formula $ABO_3$ are prepared by a process comprising subjecting a mixture of starting powders formulated to contain the components represented by A and B in the formula to a high energy milling sufficient to induce chemical reaction of the components and thereby synthesize a mechanically-alloyed powder comprising the perovskite in the form of nanostructural particles. The process according to the present invention is simple, efficient, not expensive and does not require any heating step for producing a perovskite that may easily show a very high specific surface area. Another advantage is that the perovskite obtained according to the present invention also has a high density of lattice defects thereby showing a higher catalytic activity, a characteristic which is highly desirable in their eventual application as catalysts and electronic conductors.

17 Claims, 4 Drawing Sheets

PROCESS FOR SYNTHESIZING PEROVSKITES USING HIGH ENERGY MILLING

FIELD OF THE INVENTION

The present invention relates to a process for synthesizing perovskite-type structure compounds by high energy milling. More particularly, a mixture of starting powders are milled together in a high energy mill to produce a mechanically-alloyed powder comprising a perovskite.

BACKGROUND OF THE INVENTION

Perovskite is a well-known type of mixed metal oxides. In general, mixed metal oxides are crystalline compounds and they are classified by general formulas and certain structural-type characteristics of naturally occurring minerals. The perovskite-type metal oxide has the general formula $ABO_3$ where A and B stand for cations. More than one cation for each A and B may be present. It is at once apparent that there is quite a large number of compounds which fall within the scope of the term perovskite. The compounds and their structure can be identified by X-Ray diffraction.

In prior art, perovskite compounds have been commonly used in the following fields: electrocatalysis, hydrogenation, dehydrogenation and auto-exhaust purification. One drawback with the perovskite-type metal oxides produced in prior art is that, in general, they show a very low BET specific surface area (SS) in the order of 1 $m^2/g$. Therefore despite the fact that prior art perovskite-type metal oxides are not expensive to produce, they usually show good catalytic oxidation activities, they are thermally stable and they show a good resistance to poisoning, they have found to date very limited application in place of based-noble metal catalyst used in the field of industrial pollution abatement or automobile emission control. Higher specific surface area perovskite compounds could thus have a great potential as catalyst, particularly in the selective reduction of nitrogen oxide ($NO_x$) and as electrocatalyst in the cathodic reduction of oxygen.

The known methods for preparing perovskites include sol-gel process, co-precipitation, citrate complexation, pyrolysis, spray-drying and freeze-drying. In these, precursors are prepared by a humid way such as in a mixed gel or in the co-precipitation of metallic ions under the form of hydroxides, cyanides, oxalates, carbonates or citrates. These precursors can thus be submitted to various treatments such as evaporation or combustion (SS~1–4 $m^2/g$), to the method of explosion (SS<30 $m^2/g$), plasma spray-drying (SS~10–20 $m^2/g$) and freeze-drying (SS~10–20 $m^2/g$). However, the drawbacks with all of these methods are that either low specific surface area values are reached or that they are complicated and expensive to put into practice.

The most common method for preparing perovskite catalyst is however the traditional method called "ceramic". This method simply consists in mixing constituent powders (oxides, hydroxides or carbonates) and sintering the powder mixture thus formed to high temperature. The problem with this method is that calcination at high temperature (generally above 1000° C.) is necessary to obtain the crystalline perovskite structure. Another drawback is that low specific surface area value is obtained (SS around 1 $m^2/g$). An example of such a high temperature heating method is disclosed in U.S. Pat. No. 5,093,301 where a perovskite structure to be used in a catalyst is formed after heating a ground dry powder mixture at 1300° C.

U.S. Pat. No. 4,134,852 issued in 1979 disclosed a variant to the ceramic method by "mechanically alloying", in the old sense of that expression, the constituent powders necessary for the preparation of perovskite catalyst. Indeed, it refers to a conventional grinding in order to obtain a more or less homogenous mixture of particles but not infer any chemical reaction between the components. It can be read in column 7, lines 5–8 of this patent that "[a] mechanically alloyed powder is one in which precursor components have been intimately intradispersed throughout each particle . . . ". Therefore a necessary step of the process disclosed therein to obtain the desired perovskite structure is by heating the "mechanically alloyed" powder composition to an elevated temperature greater than 800° C. (column 7, lines 61–62).

Today, the use of the expression "mechanical alloying" or "mechanosynthesis" refers among other things to a high energy milling process wherein nanostructural particles of the compounds milled are induced. Therefore it also refers to the production of metastable phases, for example high temperature, high pressure or amorphous phases, from crystalline phases stable under ambient temperature and pressure. For example, the structural transformation of alumina ($Al_2O_3$), the preparation of ceramic oxides and the preparation of stabilized zirconias by high energy milling or mechanical alloying have already been respectively disclosed in the following references: P. A. Zielinski et al. in J. Mater. Res., 1993, Vol. 8. pp 2985–2992; D. Michel et al., La revue de métallurgie-CIT/Sciences et Génies des matériaux, February 1993; and D. Michel et al., J. Am. Ceram. Soc., 1993, Vol 76, pp 2884–2888. The publication by E. Gaffet et al. in Mat. Trans., JIM, 1995, Vol 36, (1995) pp 198–209) gives an overview of the subject.

However, even if these papers disclosed the use of high energy milling, their authors have only been able to transform their starting product from one phase to another phase. The product resulting from the milling thus still has the same structure. Furthermore, none of them disclose the preparation of perovskite.

There is still presently a need for a simple process, low in cost for producing a valuable perovskite. There is also a need for a perovskite-type metal oxide with a high specific surface area and for a process for producing such a perovskite.

SUMMARY OF THE INVENTION

An object of the present invention is to propose a process for producing a perovskite-type metal oxide that will satisfy the above-mentioned needs.

According to the present invention, that object is achieved with a process for producing a perovskite of the general formula $ABO_3$ which comprises the step of subjecting a mixture of starting powders formulated to contain separately the components represented by A and B in the formula to a high energy milling sufficient to induce chemical reaction of the components and thereby synthesize a mechanically-alloyed powder comprising the said perovskite in the form of nanostructural particles.

The component represented by A preferably comprises at least one element selected from the group consisting of La, Sr, Ba, Cr, Rb, Ag, Ca, Pr, Nd, and Bi of the periodic table and the component represented by B preferably comprises at least one element selected from the group consisting of Co, Fe, Ni, Mn, Cr, Ti, Cu, Mg, V, Nb, Ta, Mo and W of the periodic table.

The starting powders are preferably a powder of $La_2O_3$ and a powder of $Co_3O_4$ and in that case, the perovskite is $LaCoO_3$ The perovskite obtained may have a BET specific surface area of at least 6 $m^2/g$, preferably substantially of 16 $m^2/g$.

According to a preferred variant of the invention, the milling step is performed under an atmosphere comprising a gas selected from the group consisting of $O_2$, $CO_2$, $NO_2$, $NH_3$, and $H_2S$ and in that case the BET specific surface area of the perovskite obtained may be at least 20 $m^2/g$.

Preferably, the high energy milling is performed in an horizontal shaker mill at an agitation speed of 1000 cycles/min for a period of at least 8 hours.

The present invention also provides a process for producing a perovskite of the general formula $ABO_3$ having a high BET specific surface area which comprises the steps of:
 a) subjecting a mixture of starting powders formulated to contain the components represented by A and B in the formula to a high energy milling sufficient to induce nanostructural particles of the components and thereby synthesize a mechanically-alloyed powder comprising a perovskite; and
 b) increasing the BET specific surface area of the perovskite obtained in step a) by further subjecting said perovskite to high energy milling to obtain a perovskite having a high BET specific surface area.

Step b) is preferably performed under a humidified atmosphere or under an atmosphere comprising a gas selected from the group consisting of $O_2$, $CO_2$, $NO_2$, $NH_3$, and $H_2S$. In the first case, the humidified atmosphere may be obtained by adding a small amount of an aqueous solution to the perovskite obtained in step a) in order to obtain a humidified mechanically-alloyed powder and the perovskite phase obtained following step b) has a BET specific surface area of at least 30 $m^2/g$.

In the second case, the milling of step b) is performed under an atmosphere comprising a gas selected from the group consisting of $O_2$, $CO_2$, $NO_2$, $NH_3$, and $H_2S$ and the BET specific surface area of the perovskite is substantially 36 $m^2/g$.

As can be appreciated, the process according to the present invention is simple, efficient, not expensive and does not require any heating step for producing a perovskite that may easily show a very high specific surface area. Another advantage is that the perovskite obtained according to the present invention also has a high density of lattice defects thereby showing a higher catalytic activity, a characteristic which is highly desirable in their eventual application as catalysts and electronic conductors.

A non-restrictive description of preferred embodiments of the present invention will now be given with reference to the appended drawings and tables.

DESCRIPTION OF A PREFERRED EMBODIMENT

Figure 1:
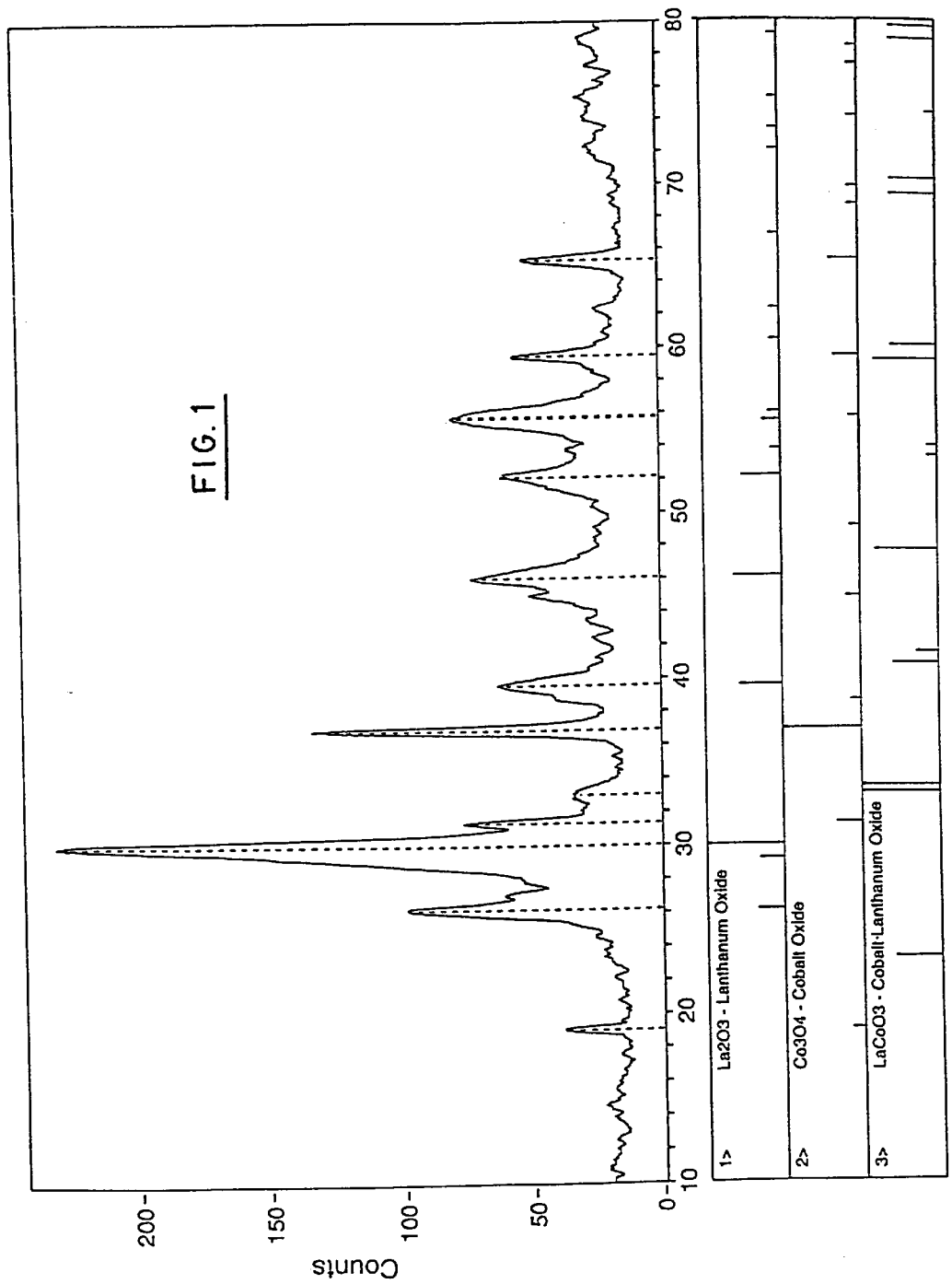
FIG. 1 is an X-ray diffraction pattern ($CuK_\alpha$ wavelength), shown on a scale of 10° to 80° diffraction angle ($2\theta$), of a sample taken after one hour of high energy milling. Peaks corresponding to the starting powders ($La_2O_3$ and $Co_3O_4$) and the obtained perovskite ($LaCoO_3$) can be identified by using the corresponding bars at the bottom of the Figure.

The present invention relates to a new process called "mechanical alloying" or "mechanosynthesis" for preparing perovskites having the empirical formula $ABO_3$ simply by subjecting to high energy milling the components represented by A and B in the formula. The man of the art will understand that A and B are being selected and mixed according to the stoichiometric proportion of the components of the desired perovskite.

As indicated throughout, the term "high energy milling" refers to the condition which is developed in the container of a "high energy mill" and where nanostructural particles of the components in the mill are induced. Examples of such high energy mill include: planetary milling machine (so called G5 and G7), PULVERISETTE™ (P5 and P7) milling planetary machine, ASI UNI-BALL MILL II™ and SPEX™ horizontal mill.

During the milling, the balls are thus projected violently way and back within the container of the mill. The balls also bang each other within the container. When sufficient mechanical energy is applied to the total charge (balls and powders), it is believed that a substantial portion of the charge is continuously and kinetically maintained in a state of relative motion. To achieve the "mechanosynthesis", the impact energy developed by these repetitive shocks must be sufficient to induce nanostructural particles of the components in the order of 10 to 100 nanometers in order to generate chemico-physical reactions only through mechanical forces.

To illustrate the invention and to give those skilled in the art a better understanding of the invention, the results obtained for the preparation of the perovskite $LaCoO_3$ are given below.

Although, in this preferred embodiment, La stands for A and Co stands for B, the range of application of the current process is much larger since, in the empirical formula $ABO_3$, A comprises at least one element selected from the group consisting of La, Sr, Ba, Cr, Rb, Ag, Ca, Pr, Nd, and Bi of the periodic table and B comprises at least one element selected from the group consisting of Co, Fe, Ni, Mn, Cr, Ti, Cu, Mg, V, Nb, Ta, Mo and W of the periodic table.

Thereby, according to the process of the invention, perovskite of the formula $A_{1-x}A'_xB_{1-y}B'_yO_3$, where A and A' are of the same valence and B the same valence as B', could be prepared. Accordingly, multiple oxides (triple, quadruple, etc. . . . ) such as $La_xSr_{1-x}CoO_3$, $La_xSr_{1-x}Co_yFe_{1-y}O_3$ and $La_{x1}Sr_{x2}Ba_{1-x1-x2}Co_{y1}Fe_{y2}Ni_{1-y1-y2}O_3$ could also be produced just by selecting and mixing the starting powders according to the stoichiometric proportion constituting the desired perovskite. Among these potential products, the ones having the most important commercial values are $LaCoO_3$, $La_{0.8}Sr_{0.2}Co_{0.85}Fe_{0.15}O_3$, and $NdMnO_3$.

To form the perovskite the starting materials are selected on a basis of availability and cost provided that the form is suitable (i.e. fine powder) and unwanted additives are not introduced into the product. In the following preferred embodiments of the invention, lanthanum has been introduced as the elementary oxide $La_2O_3$ and cobalt as the elementary oxide $CO_3O_4$. Compounds such as hydroxides, carbonates, nitrates and oxalates, could also be used.

EXAMPLE I

In normal milling conditions, starting powders are weighed and mixed in the desired proportion leading to the composition of the final compound. In this specific example, 3.3 g of lanthanum oxide ($La_2O_3$) and 1.7 g of cobalt oxide ($Co_3O_4$) were introduced in a cylindrical tempered steel container having 5 mm thick wall with three tempered steel balls [two of $\frac{7}{16}$ inches diameter (11 mm) and one of $\frac{9}{16}$ inches diameter (14 mm)]. Preferably, the total powder weight inserted into the container is about 5 to 7 g. The container is closed with a thick cover and hermetically sealed with a VITON™ O-ring. To vary the energy of milling impacts, different sets of balls having various sizes and specific densities may be used.

The container is inserted horizontally in a laboratory SPEX™ shaker mill and the milling normally proceeds at an agitation speed of 1000 cycles per minute for a period varying from 1 to 20 hours.

Although the milling proceeds at room temperature, the numerous balls shocks within the container increase its temperature. Thus the container was fan cooled and its temperature was thus kept below 40° C. Sampling were also performed at 1, 4, 8, 16 and 20 hours of milling and the crystalline structure of the product was determined by X-ray diffractometry using a PHILIPS™ or a SIEMENS D5000™ diffractometer. In both cases, the $CuK_\alpha$ was used (lambda= 1.54 Angstrom). Spectra were recorded in a step scanning from 10 to 80° in 2θ angle with a 2.4 s for each 0.05° step. Correct identification of the compounds was performed by comparing the patterns obtained with the patterns found in a patterns' library.

The specific surface area of the product was determined by using the Brunauer, Emmet, and Teller method (BET) using a computer-controlled sorption analyzer (OMNISORB 100™) from Omicron, operating in continuous mode. Samples of about 1 g were heated under a vacuum at various temperatures (see Table 1) until complete removal of humidity (20 to 24 hours) prior to the adsorption-desorption experiments. Nitrogen adsorption measurement was performed at liquid nitrogen temperature, with a scanning pressure of up to 75 Torr.

FIGS. 1 to 4 illustrate the X-ray patterns allowing to deduct the evolution of the crystalline structure from the product found in the container at different period during the milling.

As seen in FIG. 1, after one hour of milling, the typical patterns of the two starting oxides $La_2O_3$ and $Co_3O_4$ are clearly seen. Perovskite-type structure ($LaCoO_3$) begins to stand out.

Figure 2:
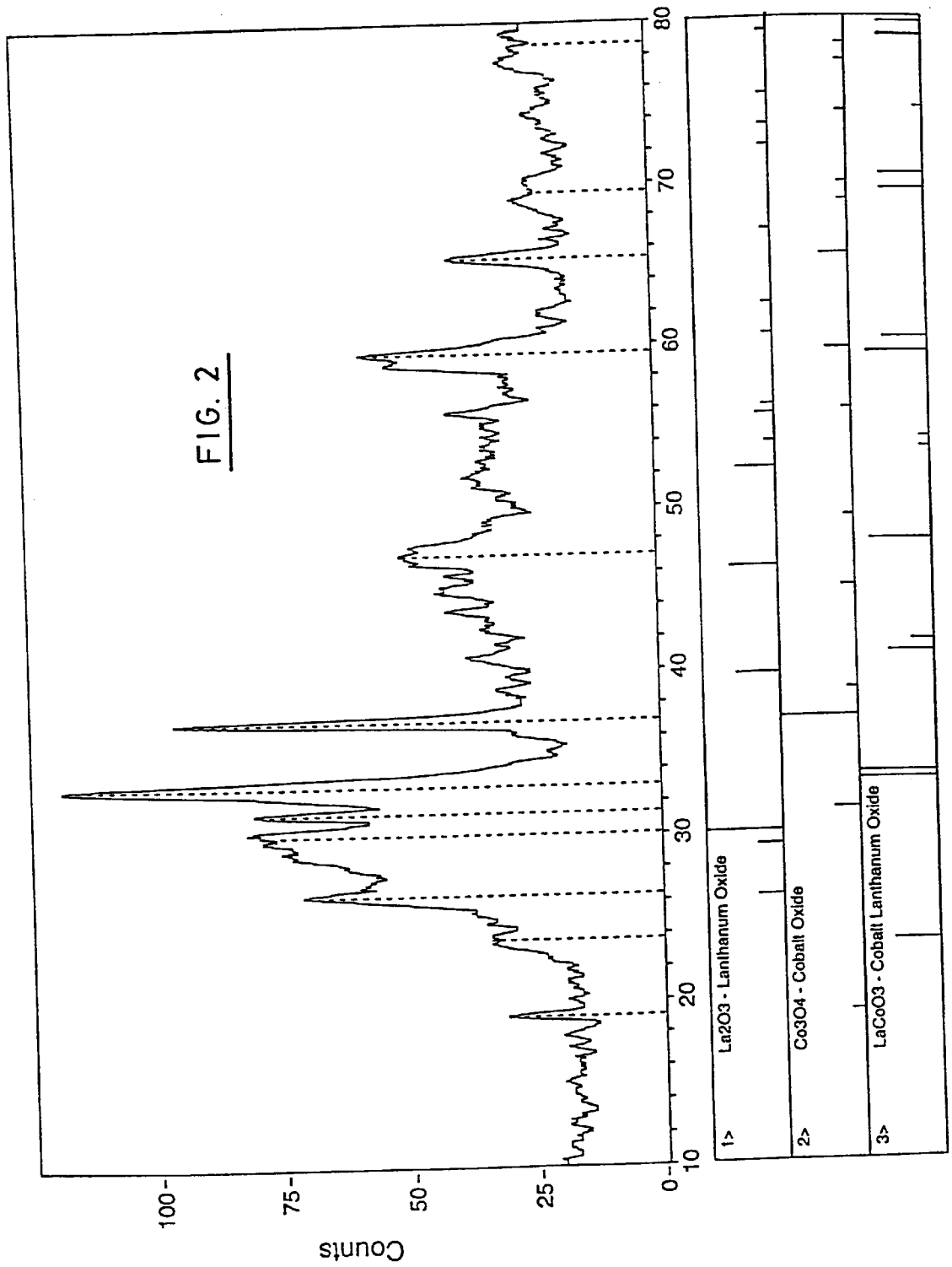
FIG. 2 is an X-ray diffraction pattern of a sample taken after four hours of high energy milling.
Figure 3:
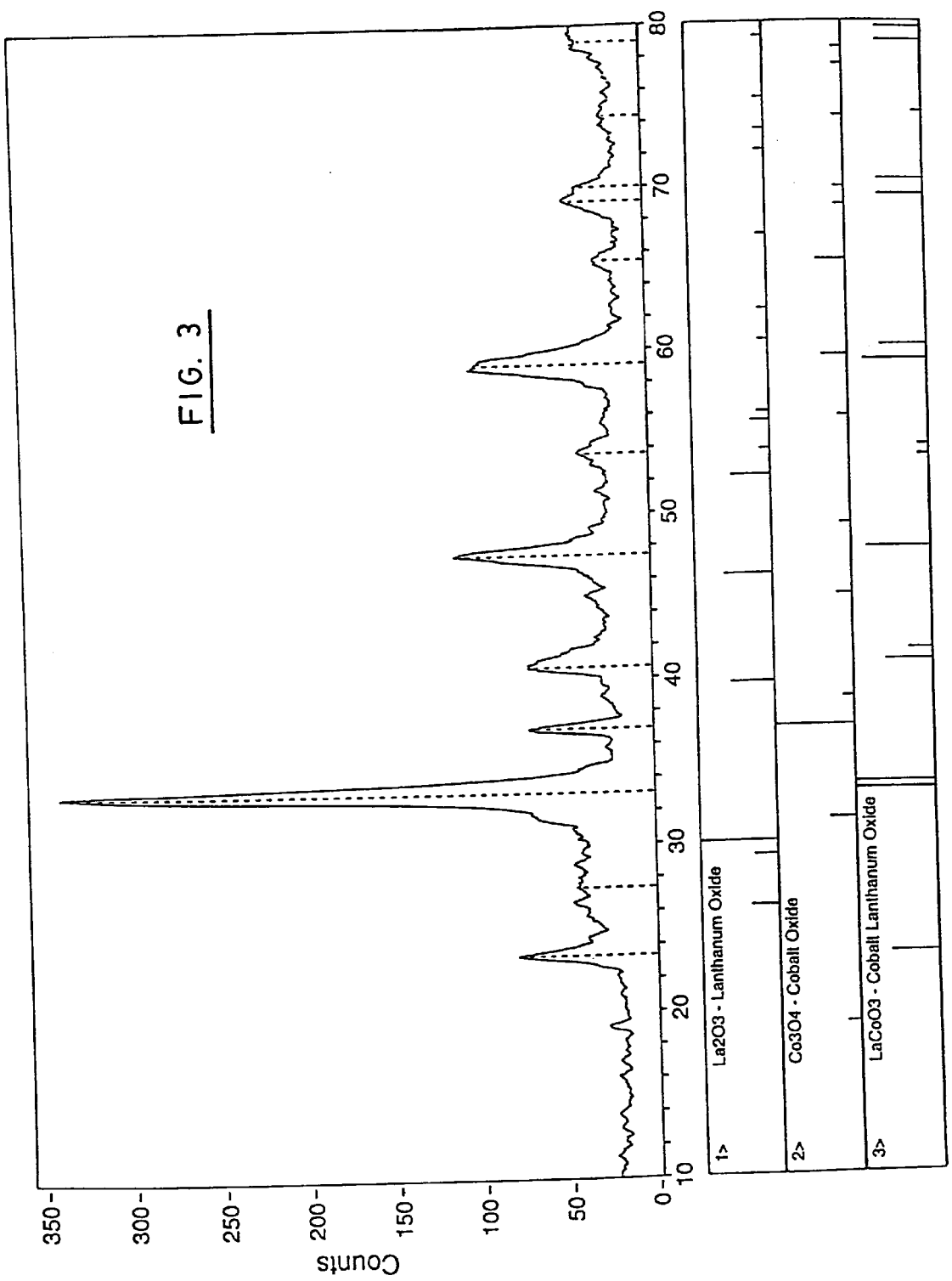
FIG. 3 is an X-ray diffraction pattern of a sample taken after eight hours of high energy milling.
Figure 4:
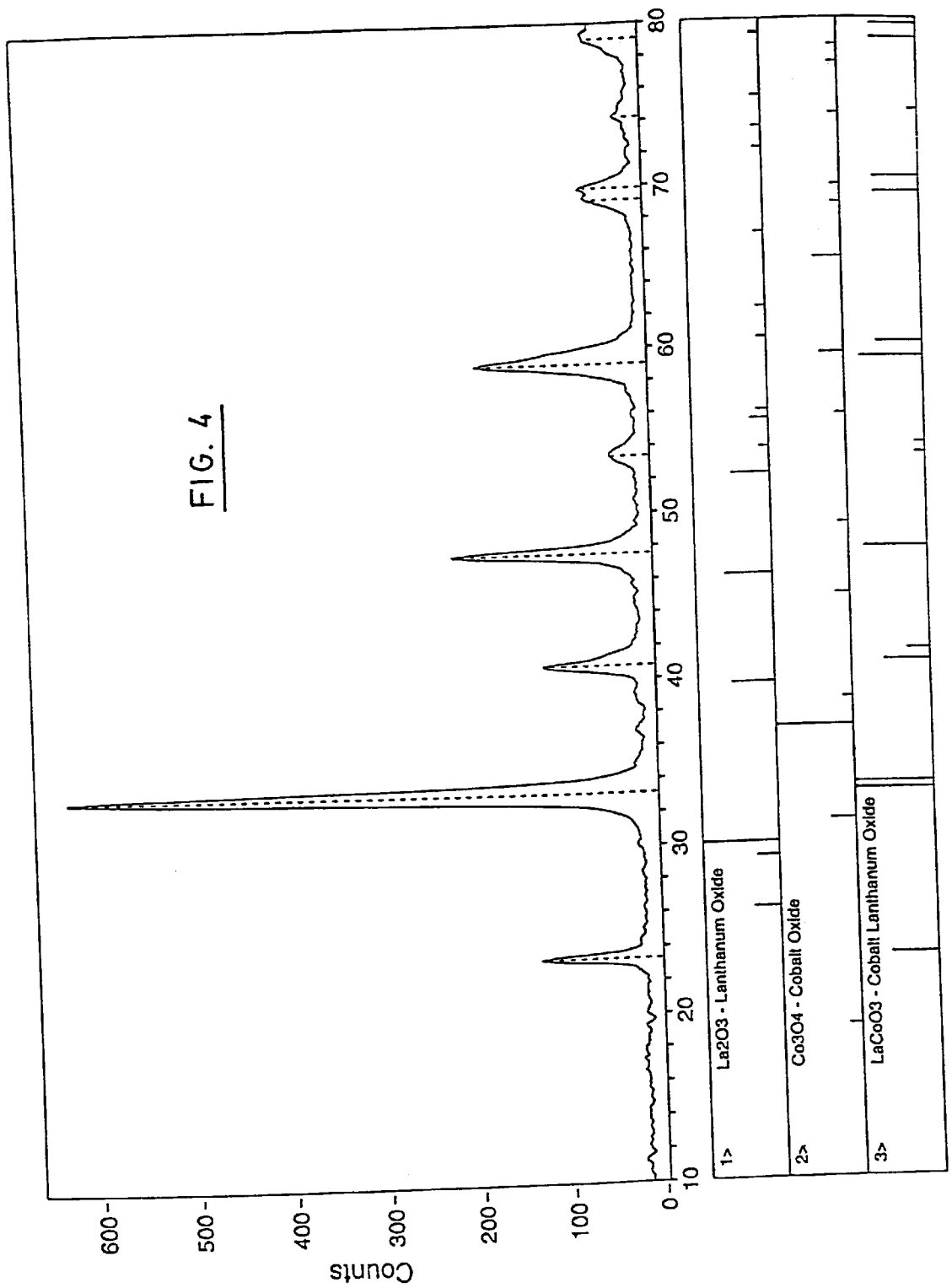
FIG. 4 is an X-ray diffraction pattern of a sample taken after sixteen hours of high energy milling. By using the bars at the bottom of the Figure it can be seen that all the major peaks correspond to the produced perovskite $LaCoO_3$.

As shown in FIGS. 2 and 3 after four and height hours of milling, the intensities of the starting oxides peaks diminish gradually. It can also be appreciated that the peaks of the perovskite-type structure grow accordingly.

After sixteen hours of milling (FIG. 4), the content of the container is practically all converted in perovskite since the patterns of the two starting oxides have almost all disappeared. The major peaks thus show exclusively the presence of perovskite structure compound. In fact, this X-ray pattern shows that about 95% of the content of the powder within container consists of perovskite after sixteen hours of milling. Specific surface area measurements revealed that this final compound has a specific surface area of about 16 m²/g, a value distinctly higher than that of conventional method which is only in the order of a few m²/g.

It has also been discovered that the milling performance may be increased by replacing the normal milling atmosphere. For example, in a second variant of the process, the milling atmosphere was replaced by injecting into the container pure oxygen ($O_2$). This causes the speed of the reaction to be slightly increased. The complete conversion (as evaluated by X-ray diffraction) of the starting oxides to perovskite was obtained in 14 hours as compared to 16 hours where the atmosphere was not changed.

Likewise, it is believed that the use of other gases such as $CO_2$, $NO_2$, $NH_3$, and $H_2S$, instead of using ambient air as the reaction atmosphere, may have a positive effect on the milling reaction. More particularly, it increases the speed of the reaction and/or it increases the specific surface area of the resulting perovskite.

Since the milling is normally performed in a steel container, iron contamination in the final compound was measured. Analysis showed that following 20 hours of normal milling, this contamination is minor since it constitutes less than 1% of the final compound as detected by scanning electronic microscopy (data not shown).

In order to improve the specific surface area of the perovskite obtained in normal milling conditions, various milling conditions were tested. These include: replacing the tempered steel balls and container by tungsten one's; increasing the duration of milling; and submitting the perovskite obtained after normal milling conditions to a subsequent milling step, called a post-treatment, under a modified atmosphere.

EXAMPLE II

It is believed that during the high energy milling using a sealed container, the oxygen contained in the trapped air is rapidly consumed by the metallic atoms exposed to the surface newly created by the breaking of crystals under the repetitive impacts within the container. Thus, very rapidly, the milling is performed under an inert nitrogen atmosphere. In such conditions, the exposed surfaces "stick back" together, giving perovskite with lower specific surface area. Therefore, like for the first step, the Applicant modified the normal milling atmosphere in order to increase the specific surface area.

For example, in a third preferred embodiment, perovskite was first synthesized in a sealed container according to example 1. Then the perovskite newly synthesized was further high energy milled for a period of up to 72 hours under constant level oxygen atmosphere. Oxygen level was kept to a normal level (air) by replacing the sealed joint of the container by a filter-paper ring in order to let the normal air to seep into the container. By doing so, the BET specific surface area of the milled perovskite was increased from about 16 m²/g to about 23 m²/g.

Likewise, it is believed that the use of other reactive gases such as $CO_2$, $NO_2$, $NH_3$, and $H_2S$, instead of using ambient air as the reaction atmosphere, may have a positive effect on the milling reaction (increase of the speed of the reaction and/or increase of the specific surface area of the resulting perovskite, etc.).

EXAMPLE III

In a fourth variant, the perovskite was obtained after normal milling conditions in a tungsten carbide container. However, since the density of the tungsten carbide balls is higher than the one of tempered steel balls, the speed of agitation must be reduced to avoid the destruction of the container or the balls.

In a fifth variant, the perovskite obtained in normal milling conditions was post-treated. This post-treatment comprises further high energy milling of the perovskite under an humidified atmosphere. Preferably, to obtain said humidified atmosphere, a small quantity of water (six drops) was simply added to said perovskite (~5 g), the container was sealed and the whole was submitted to a subsequent normal milling for one to six hours.

Table 1 presents the specific surface area measurements using the BET method following the milling of lanthanum oxide ($La_2O_3$) and cobalt oxide ($Co_3O_4$) in order to obtain a perovskite structure of the type $LaCoO_3$ according to the first, fourth or fifth preferred embodiment of the invention.

As can be appreciated, the milling within a tungsten carbide container (samples 1 and 2) does not improve the specific surface area of the resulting perovskite as compared to perovskite obtained within a tempered steel container (example 1, sample 3). However, further high energy milling of the perovskite under a humidified atmosphere provides a perovskite having a specific surface area of up to about 36 $m^2/g$ (sample 4), one of the highest value reached in the art. The humidified milling atmosphere created by the addition of water during the subsequent milling of the perovskite is thus one of the factors which have an important positive influence on the increase of the specific surface area of the perovskite obtained according to this process.

The catalytic activity of the post-treated perovskite (sample 4) was also evaluated and compared with the catalytic activity of sample 1. As seen in Table 2, the perovskite obtained following the post-treatment has a Minimal Temperature of Total Conversion (MTTC) lower than the untreated perovskite. It has been calculated that this 70° C. difference to the advantage of the post-treated sample, corresponds to a catalytic activity superior by a factor of about 600 to 2000 times over sample 1. Such an increase is largely superior (from about 50 to 200 times) to what should have been normally obtained for a perovskite having a specific surface area of 36 $m^2/g$, since the specific surface area ratio of the post-treated perovskite (sample 4) over the untreated (sample 1) is only 11.6 (36/3.1).

These results thus show that, besides having a high specific surface area, the post-treated perovskite obtained according to this variant of the process of the invention also has a high density of lattice defects thereby having a higher catalytic activity. A high density of lattice defects is a characteristic which is highly desirable for the eventual application of the perovskite as catalyst and in electronic conductive components.

According to another aspect of the invention, the perovskite may be doped with a transition group metal or a precious group metal. In the industry, the doping of a perovskite used as catalyst enables the sulfur poisoning ($SO_2$) to be reduced. Preferably the doping metal used for doping the perovskite is selected from the group consisting of platinum, ruthenium, rhodium, nickel, cobalt, iron and copper.

The doping is preferably performed only once the perovskite has been synthesized since an early doping would reduce the specific surface area of the synthesized perovskite. Advantageously, the doping can be performed during the post-treatment step with the help of a piece of the selected doping metal inserted in the container during the subsequent high energy milling. However, the perovskite obtained after the milling could also be doped by treating said perovskite with a deposit of the doping metal.

Although preferred variants of the invention according to the present invention have been described in detail herein and illustrated in the accompanying figures and tables, it is to be understood that the invention is not limited to these precise embodiments and that various changes and modifications may be effected therein without departing from the scope or spirit of the invention.

For example, a planetary ball-milling machine could be used instead of an horizontal mill. Starting powders could also be grinded before their high energy milling. Likewise, the perovskite obtained after the milling according to the process of the invention, could also be treated to increase its catalytic activity by removing its iron contamination.

TABLE I

Specific surface area measurements using the BET method

| Sample | Milling conditions and duration | | Heating temperature (° C.) | Surface area ($m^2/g$) |
|---|---|---|---|---|
| 1 | A) Normal milling: | | 400 | 3.1 |
| | Duration | = 12 hours | | |
| | Atmosphere | = air | | |
| | Container + Balls | Tungsten carbide | | |
| | Speed | = 700 cycles/min | | |
| 2 | A) Normal milling: | | | |
| | Duration | = 20 hours | 200 | 5.6 |
| | Atmosphere | = air | 400 | 7.6 |
| | Container + Balls | = Tungsten carbide | | |
| | Speed | 700 cycles/min | | |
| 3 | A) Normal milling: | | | |
| | Duration | = 20 hours | 200 | 10.2 |
| | Atmosphere | = air | 380 | 16.3 |
| | Container + Balls | = Tempered steel | | |
| | Speed | = 1000 cycles/min | | |
| 4 | A) Normal milling: | | | |
| | Duration | = 24 hours | | |
| | Atmosphere | = air | | |
| | Container + Balls | = Tempered steel | | |
| | Speed | = 1000 cycles/min | | |
| | B) Post-treatment: | | | |
| | Duration: | = Subsequent milling for 6 hours | 200 | 35.9 |
| | | | 370 | 32.1 |
| | Atmosphere | = Humidified | | |
| | Container + Balls | = Tempered steel | | |
| | Speed | = 1000 cycles/min | | |

TABLE II

Comparison of the catalytic activity* of standard perovskite with the post-treated perovskite obtained according to the method of the invention

| Perovskite | Specific surface area (m²/g) | MTTC** |
|---|---|---|
| Untreated (sample 1) | 3.1 | 295° C. |
| Post-treated (sample 4) | 36 | 225° C. |

*Measured by the conversion of n-Hexane (Conditions: $y_{C6H14}$ = 1%; $y_{O2}$ = 89.1%; Catalyst weight = 0.105 + 0.0015 g)
** MTTC = Minimal Temperature of Total Conversion at a space velocity of 22 500 h$^{-1}$.

What is claimed is:

1. A process for mechanosynthesizing a perovskite of the general formula $ABO_3$, said process consisting essentially of the step of subjecting a mixture of starting powders formulated to contain separately the components represented by A and B in the formula to a high energy milling under an oxygen containing atmosphere, said high energy milling being sufficient to induce chemical reaction of the components and thereby mechanosynthesize said perovskite in the form of a nanostructural single phase perovskite.

2. A process according to claim 1, wherein:

A comprises at least one element selected from the group consisting of La, Sr, Ba, Cr, Rb, Ag, Ca, Pr, Nd, and Bi; and B comprises at least one element selected from the group consisting of Co, Fe, Ni, Mn, Cr, Ti, Cu, Mg, V, Nb, Ta, Mo and W.

3. A process according to claim 2, wherein the starting powders are a powder of $La_2O_3$ and a powder of $Co_3O_4$.

4. A process according to claim 3, wherein the perovskite is $LaCoO_3$.

5. A process according to claim 4, wherein the perovskite has a BET specific surface area of at least 6 m²/g.

6. A process according to claim 5, wherein the BET specific surface area of the perovskite is about 16 m²/g.

7. A process according to claim 1, wherein the BET specific surface area of the perovskite obtained is at least 20 m²/g.

8. A process according to claim 7, wherein the BET specific surface area of the perovskite obtained is about 23 m²/g.

9. A process according to claim 1, wherein the high energy milling is performed in an horizontal shaker mill at an agitation speed of 1000 cycles/min for a period of at least 8 hours.

10. A process for mechanosynthesizing a perovskite of the general formula $ABO_3$, having a high BET specific surface area, said process consisting essentially of the steps of:

a) subjecting a mixture of starting powders formulated to contain separately the components represented by A and B in the formula to a high energy milling under an oxygen containing atmosphere, said high energy milling being sufficient to induce chemical reaction of the components and thereby mechanosynthesize said perovskite in the form of a nanostructural single phase perovskite; and b) increasing the BET specific surface area of the perovskite mechanosynthesized in step a) by further subjecting said perovskite to high energy milling.

11. A process according to claim 10, wherein the high energy milling of step b) is performed under a humidified atmosphere.

12. A process according to claim 11, wherein the humidified atmosphere is obtained by adding a small amount of an aqueous solution to the perovskite mechanosynthesized in step a) in order to obtain a humidified perovskite.

13. A process according to claim 12, wherein the mechanosynthesized perovskite following step b) has a BET specific surface area of at least 30 m²/g.

14. A process according to claim 10, wherein the high energy milling of step b) is performed under an atmosphere comprising a gas selected from the group consisting of $O_2$, $CO_2$, $NO_2$, $NH_3$, and $H_2S$.

15. A process according to claim 13, wherein the BET specific surface area of the perovskite is about 36 m²/g.

16. A perovskite having the formula $LaCoO_3$ and a BET specific surface area of at least 20 m²/g.

17. The perovskite according to claim 16 having a BET specific surface area between 20 and 36 m²/g.

* * * * *